United States Patent
Ono et al.

(10) Patent No.: US 7,376,393 B2
(45) Date of Patent: May 20, 2008

(54) COMMUNICATION CONTROL METHOD IN WIRELESS DATA COMMUNICATION NETWORK

(75) Inventors: Takatsugu Ono, Kobe (JP); Akira Naitou, Kobe (JP); Naoto Matsushita, Kobe (JP); Toshikazu Nakahira, Kobe (JP); Reiko Hiraoka, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 484 days.

(21) Appl. No.: 10/317,135

(22) Filed: Dec. 12, 2002

(65) Prior Publication Data

US 2003/0109273 A1    Jun. 12, 2003

(30) Foreign Application Priority Data

Dec. 12, 2001 (JP) .............. P2001-378399

(51) Int. Cl.
H04B 7/00 (2006.01)
(52) U.S. Cl. ............ 455/41.2; 455/566; 370/338
(58) Field of Classification Search ........... 455/41.2, 455/41.3, 566; 370/338; 375/222
See application file for complete search history.

(56) References Cited

U.S. PATENT DOCUMENTS 5,742,912 A * 4/1998 Nishiyama et al. ......... 455/566
2002/0052182 A1 * 5/2002 Mayuzumi ................. 455/41

FOREIGN PATENT DOCUMENTS

| EP | 1024626 A1 | 8/2000 |
|---|---|---|
| EP | 1 100 229 | 5/2001 |
| JP | 0939530 A2 | 9/1999 |
| JP | 11-288362 | 10/1999 |
| JP | 2000-32005 | 1/2000 |
| JP | 2000-132494 | 5/2000 |
| JP | 2000-224156 | 8/2000 |
| JP | 200-261560 | 9/2000 |
| JP | 2000-276269 | 10/2000 |
| JP | 2001-8274 | 1/2001 |
| JP | 2001-045012 | 2/2001 |
| JP | 2001-060907 | 3/2001 |
| JP | 2001-144767 | 5/2001 |
| JP | 2001-144827 | 5/2001 |
| JP | 2001-197150 | 7/2001 |
| KR | 2001-0028757 | 4/2001 |

OTHER PUBLICATIONS

"Nikkei Electronics", Dec. 13, 1999 (No. 759) pp. 140-163 (Partial English translation of pp. 142-143).

* cited by examiner

*Primary Examiner*—Philip J. Sobutka
(74) *Attorney, Agent, or Firm*—Wenderoth, Lind & Ponack, L.L.P.

(57) ABSTRACT

A setting for formation of a network is facilitated for wireless data communications. When forming a network by Bluetooth, in a mobile phone serving as a master, a display screen for apparatus selection is displayed, so that a user can select an apparatus to be connected to the network. When the user selects an apparatus, the screen is shifted to a display screen for function selection so that a connection state can be set for each function.

11 Claims, 4 Drawing Sheets

COMMUNICATION CONTROL METHOD IN WIRELESS DATA COMMUNICATION NETWORK

BACKGROUND OF THE INVENTION

1. Field of the Invention

The present invention relates to a method for controlling communications in a wireless data communication network such as Bluetooth.

2. Description of the Related Art

Conventionally, information processors such as personal computers are commonly used in the form in which a plurality of information processors are connected mutually so as to form a network. Considerable attention is paid to Bluetooth as a technology that can form a network for wireless communications between various electronic apparatuses such as portable telephones, various personal computers including portable computers, digital cameras, and portable video games. A general commentary article about Bluetooth is No. 759 (Dec.r, 13, 1999) of Nikkei Electronics published by Nikkei BP Co. LTD., for example.

Japanese Unexamined Patent Publication JP-A 2000-224156 (2000) discloses a technique for enhancing security with encryption in a close range wireless communication network such as Bluetooth. Japanese Unexamined Patent Publication JP-A 2001-8274 (2001) discloses a technique allowing hand-free talk in which an audio apparatus in a car and a mobile phone are connected by a short range wireless connection such as Bluetooth so that a driver of a car can use a mobile phone via the audio apparatus safely without holding the mobile phone set by hand. Japanese Unexamined Patent Publication JP-A 2000-261560 (2000) discloses a technique about a wireless acoustic coupler modem that connects wirelessly an acoustic coupler and a computer by wireless communications such as Bluetooth or by infrared communications such as IrDA (Infra-red Data Association). Japanese Unexamined Patent Publication JP-A 2000-276269 (2000) discloses a technique that connects between a plurality of computers and a data input apparatus such as a keyboard or a mouse by a wireless connection such as Bluetooth and performs switching.

In a network formed with computers or the like, in general, high-speed and high reliability are promoted. For example, Japanese Unexamined Patent Publication JP-A 2000-32005 (2000) discloses a technique that divides data to be transmitted into a plurality of segments, and transfers each segment in a plurality of asynchronous communication packets under the rule that if the transfer of segments is interrupted, retransmission starts with a packet whose transfer is interrupted.

Priorities are set for a selection among a plurality of apparatuses connected to a network so as to prevent a plurality of apparatuses from operating at the same time. Japanese Unexamined Patent Publication JP-A 11-288362 (1999) discloses a technique in which a printing apparatus that outputs in the previous time of a plurality of printing apparatuses connected to a network is used by priority. Japanese Unexamined Patent Publication JP-A 2000-132494 (2000) discloses a technique that allows only a newly connected audio apparatus of a plurality of audio apparatuses connected via USB (Universal Serial Bus) to output.

Although a wireless data communication network such as Bluetooth connects various apparatuses flexibly, it utilizes a 2.4 GHz frequency band called ISM (Industry Science Medical) band and uses a frequency hopping spreading modulation system so that a difference in the way to change the frequency prevents other communications from being mixed. Furthermore, carrier sensing, which is commonly performed in other network connection methods, is not performed, and when a problem is caused in transfer of data, for example, because of collision of carriers, the problem is addressed by retransmission of the data.

Therefore, when forming a network using Bluetooth, connection forms as to where to receive which data and reconnection conditions for the time when connection is cut during data transfer have to be set. However, techniques that make it easy for users who have little technical knowledge to actually perform these connections have not been developed yet.

SUMMARY OF THE INVENTION

It is an object of the invention to provide a method for controlling communications in a wireless data communication network that allows a user to set easily the conditions for reconnection performed when connection forms or communications of a wireless data communication network formed with Bluetooth or the like are disconnected.

The invention provides a method for controlling communications in a wireless data communication network formed by connecting a plurality of apparatuses on which a wireless data communication function is mounted, the method comprising the steps of:

when connecting each apparatus to the wireless data communication network, displaying apparatuses that can be connected within a predetermined range on a screen, displaying a selection candidate for setting a connection form for each function of each apparatus on a screen in response to a selection of an apparatus by a user, and performing setting in accordance with a selection result of the user.

According to the invention, for example, when connecting a plurality of apparatuses in order to form a wireless data communication network between the plurality of apparatuses on which a wireless data communication function typified by Bluetooth is car-mounted, apparatuses that can be connected within a predetermined range are displayed on a screen. A user can select an apparatus to actually be connected from the screen, which facilitates selection of the apparatus. When the apparatus is selected, a selection candidate for setting a connection form is displayed on a screen for each function required by the apparatus. Therefore, when the user conducted a selection operation while looking at the screen, control data, for example, is transferred in accordance with the selection result among the apparatuses, and a connection form can be set in accordance with the selection of the user.

According to the invention, when performing connections in order to form a wireless data communication network among a plurality of apparatuses on which a wireless data communication function is mounted, a user can select an apparatus to be actually connected from the screen, and easily can set a connection form for each function required by the selected apparatus.

The invention provides a method for controlling communications in a wireless data communication network formed by connecting a plurality of apparatuses on which a wireless data communication function is mounted, the method comprising the steps of:

when connecting the apparatuses to the wireless data communication network, displaying apparatuses that can be connected within a predetermined range on a screen, displaying a selection screen for setting for data transfer with an apparatus selected by a user in response to the selection of the apparatus by the user, performing setting for the data transfer in accordance with a selection result, and displaying a screen on which a basis on determination whether data is transferred from the beginning of the data or the middle thereof is set as a reconnection data transfer condition at the time of a disconnection of the data transfer in a ratio of transferred data with respect to entire data.

According to the invention, for example, when connecting a plurality of apparatuses in order to form a wireless data communication network among the plurality of apparatuses on which a wireless data communication function typified by Bluetooth is mounted, an apparatus that can be connected within a predetermined range is displayed on a screen. A user can select an apparatus to be actually connected from the screen, which facilitates selection of the apparatus. When the apparatus is selected, a selection screen for setting for data transfer is displayed. Therefore, the setting for data transfer can be performed in accordance with the apparatus. For setting a reconnection data transfer condition at the time of a disconnection of data transfer, the basis on which it is determined whether the data is transferred from the beginning of the data or the middle thereof is set in a ratio of transferred data with respect to the entire data, and thus the user can operate easily.

According to the invention, when performing connections in order to form a wireless data communication network among a plurality of apparatuses on which a wireless data communication function is mounted, it is easy for a user to select an apparatus to be actually connected from the screen and to perform setting for data transfer and set a reconnection data transfer condition at the time of a disconnection of the data transfer.

In the invention, it is preferable that the data transfer is performed in a packet unit, and the determination is set by selecting whether the data is retransmitted from the beginning of a packet that is being transmitted at the time of a disconnection of the data transfer or from the middle of the packet.

According to the invention, the data is transferred in a packet unit, and the user can set the retransfer condition at the time of a disconnection in the middle of the packet by selecting whether the data is retransferred from the beginning of the packet or the middle thereof.

According to the invention, the user can set the retransfer condition at the time of a disconnection in the middle of the data transferred in a packet unit by selecting whether the data is retransferred from the beginning of the packet or the middle thereof.

Furthermore, the invention provides a communication control program for realizing the method for controlling communications in a wireless data communication network.

The invention provides a computer readable recording medium on which a program is recorded which causes a computer to implement in connecting a plurality of apparatuses on which a wireless data communication function is mounted, to a wireless data communication network, the steps of:

displaying ones of the apparatuses that can be connected within a predetermined range on a screen;

displaying a selection candidate for setting a connection form for each function of each apparatus on a screen in response to a selection of an apparatus by a user; and performing setting in accordance with a selection result of the user.

The invention provides a computer readable recording medium on which a program is recorded which causes a computer to implement, in connecting a plurality of apparatuses on which a wireless data communication function is mounted, to a wireless data communication network, the steps of:

displaying ones of the apparatuses that can be connected within a predetermined range on a screen;

displaying a selection screen for setting for data transfer with an apparatus selected by a user in response to the selection of the apparatus by the user to perform setting for the data transfer in accordance with a selection result; and displaying a screen on which a basis on determination whether data is transferred from the beginning of the data or the middle thereof is set as a reconnection data transfer condition at the time of a disconnection of the data transfer, in a ratio of transferred data with respect to entire data.

According to the invention, the communication control program is read in an apparatus that can read a program and operate according to the read-in program, such as a computer. When forming a wireless data communication network among a plurality of apparatuses on which a wireless data communication function typified by Bluetooth is mounted, if the user conducted a selection operation while looking at the screen, control data is transferred in accordance with the selection result among the apparatuses, and a connection form can be set in accordance with the selection of the user.

According to the invention, the communication control program is read in a computer or the like, and when forming a wireless data communication network between a plurality of apparatuses on which a wireless data communication function is mounted, if the user conducted a selection operation while looking at the screen, a connection form can be set easily in accordance with the selection of the user.

Furthermore, the present invention provides a communication control apparatus for realizing the communication control method in a wireless data communication network.

According to the invention, when forming a wireless data communication network among a plurality of apparatuses on which a wireless data communication function typified by Bluetooth is mounted, if the user conducted a selection operation while looking at the screen, control data is transferred in accordance with the selection result among the apparatuses, and a connection form can be set in accordance with the selection of the user.

According to the invention, when forming a wireless data communication network among a plurality of apparatuses on which a wireless data communication function is mounted, if the user conducted a selection operation while looking at the screen, control data is transferred in accordance with the selection result among the apparatuses, and a connection form can be set in accordance with the selection of the user.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1A:
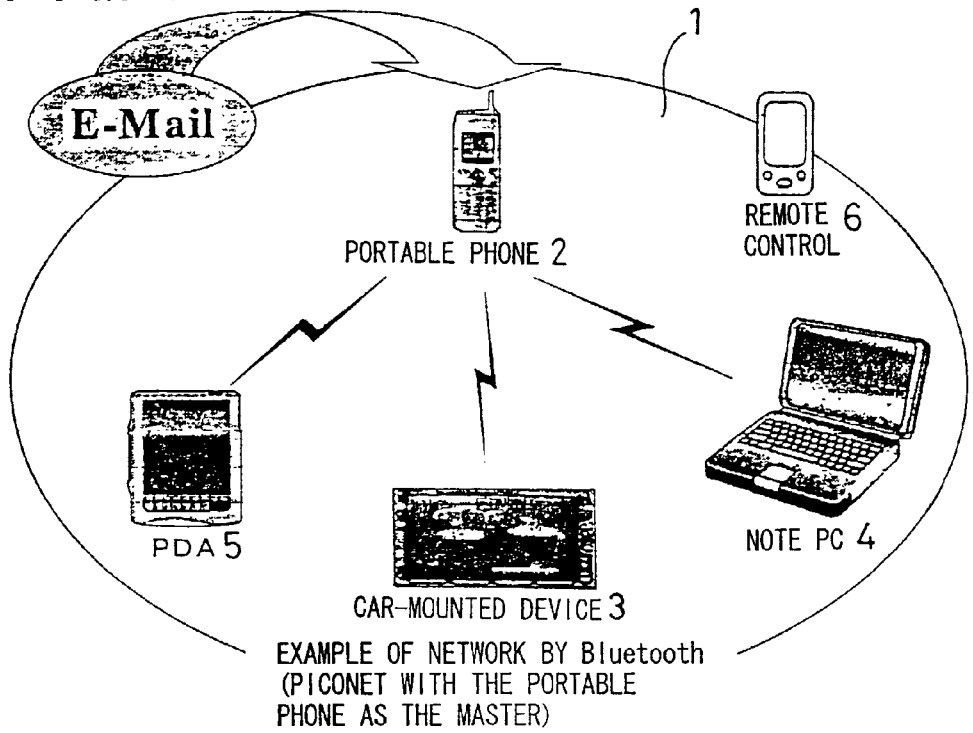
FIGS. 1A and 1B are a diagram showing a schematic system configuration of a network, which is one embodiment of the present invention, and a diagram showing a screen for connection setting, respectively.

Now referring to the drawings, preferred embodiments of the invention are described below.

FIG. 1A shows a schematic system configuration of a network 1, which is one embodiment of the present invention. The network 1 is formed in a car, and a plurality of apparatuses on which Bluetooth is mounted as a wireless data communication function including a mobile phone 2, a car-mounted apparatus 3, a note personal computer (hereinafter, abbreviated as "note PC (personal computer)" 4, a portable information apparatus (hereinafter, abbreviated as "PDA (Personal Digital Assistant) 5, and a remote control 6 are wireless-connected. In Bluetooth, the network 1 called "piconet" in a unit in which one apparatus as a master has at most seven apparatuses as slaves is formed. Each apparatus in the piconet is assigned a 3 bit address by the master, and can be paged individually by the master. When the master sends out an address whose bits are all 0, this is regarded as a broadcast, which is a transmission to all the apparatuses.

Apparatuses that satisfy the specification of Bluetooth can be mutually wireless-connected and can be the master or a slave. For the master, a timing is set such that the frequency is changed 1,600 times per second, and slaves transfer data in synchronization with the timing of the master while switching the direction alternately from the master to the slaves and from the slaves to the master. In the network 1 of this embodiment, the mobile phone 2 serves as the master and a piconet is formed between the mobile phone 2 and other apparatuses. In Bluetooth, a scatternet in which piconets are connected can be formed with a piconet as the minimum unit. One piconet can be formed in the range of about 10 m around the master.

The car-mounted apparatus 3 can be an audio apparatus, a navigation apparatus or the like. There are some constraints on the area in which the car-mounted apparatus 3 is provided such as a dashboard in a car, and in some cases, a large number of functions are put together. The apparatuses connected to the network 1 include apparatuses carried by the driver or passengers of a car such as a portable MD. In Bluetooth, any apparatus can be the master.

Figure 1B:
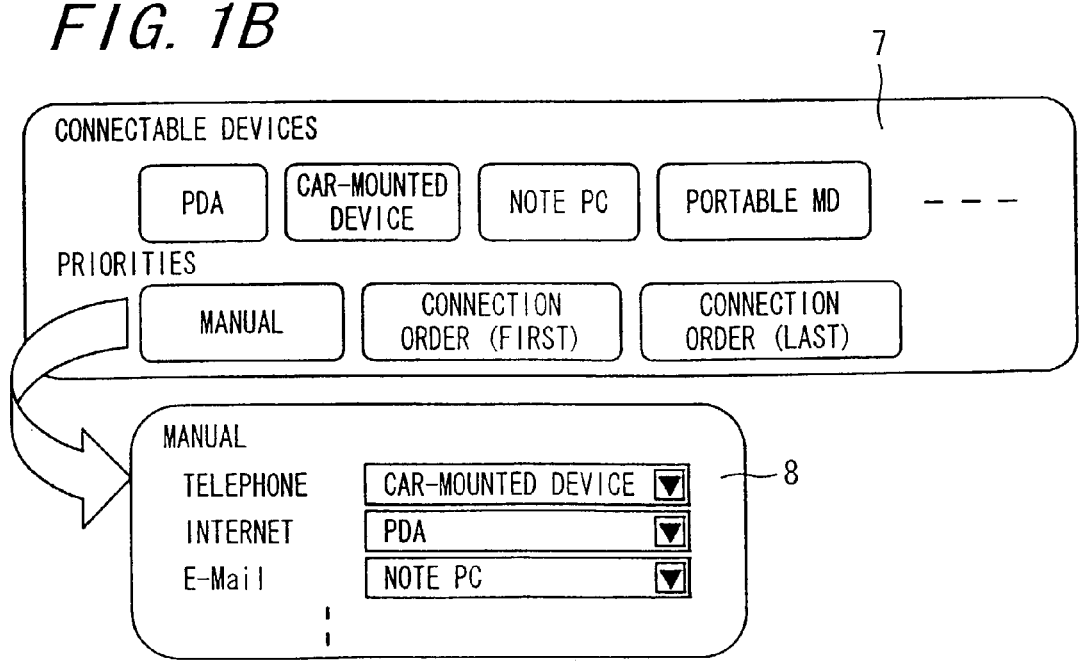

FIG. 1B shows a screen for selecting other apparatuses as a slave with the mobile phone 2 of FIG. 1A as the master and setting a connection form. First, utilizing a display screen of the mobile phone 2, a display screen 7 for apparatus setting is displayed according to an application program for setting that operates on the mobile phone 2. Candidates of connectable apparatuses are displayed, for example, in the form of a list of apparatuses provided with data for connections. A user selects and designates an apparatus to actually be connected from the displayed apparatuses. In the example of FIG. 1A, the PDA 5, the car-mounted apparatus 3 and the note PC 4 are selected. The next display is for function setting in which communication priorities can be selected.

When "manual" is selected as shown in FIG. 1B, the screen is shifted to a display screen 8 for function selection, and the car-mounted apparatus 3, the PDA 5 and the note PC 4 can be selected for "telephone", "Internet" and "E-mail", respectively, within the network. When the inverse triangle on the right side of the selection box is clicked, a list containing other apparatuses is displayed, and one of them can be selected. When the car-mounted apparatus 3 is set for the telephone, communications between the mobile phone 2 and an external phone can be performed through the car-mounted apparatus 3. Therefore, when the driver of the car is the user, the user does not have to carry the mobile phone 2 all the time, communications relayed by the mobile phone 2 via the wireless data communications from the car-mounted apparatus 3 can be performed, and thus hand-free talk can be realized.

Figure 2:
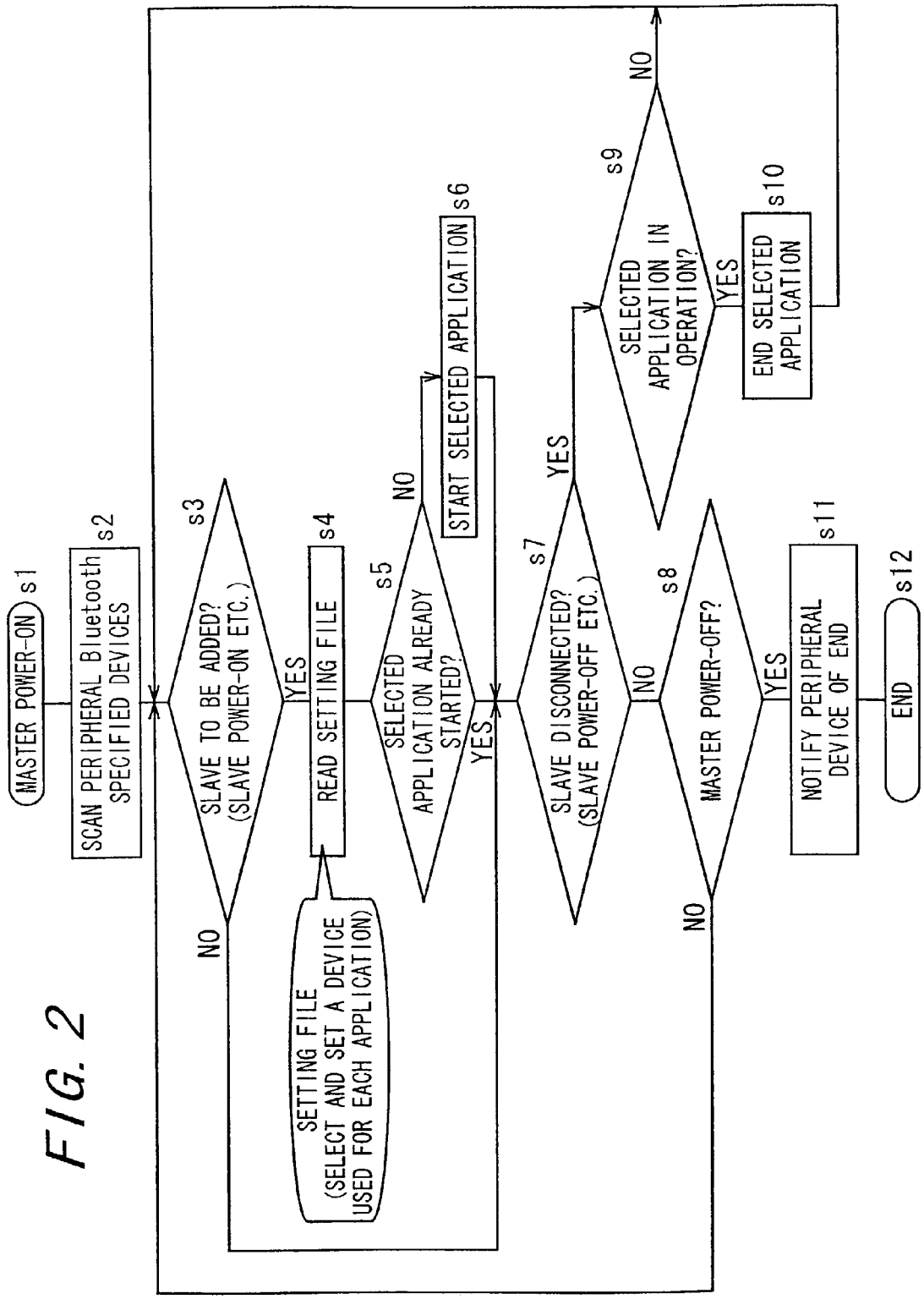
FIG. 2 is a flowchart showing an operation procedure of a master of the embodiment of FIG. 1.

FIG. 2 shows an overall control procedure in the mobile phone 2, which serves as the master in the network 1 in the embodiment of FIGS. 1A and 1B. In step s1, the power of the master is turned on, and then in step s2, apparatuses specified for Bluetooth that are around the master are scanned. In Bluetooth, four states of "in a disconnected state", "in the course of connection", "in a connected state", and "in a low power consumption state" can be distinguished. The disconnected state is in a standby mode, which is a wait state in which reception is performed once per 1.28 seconds. For scanning of the master, in an inquiry mode in the course of connection in which addresses of slaves are not designated, an inquiry is made. When a slave responds, the master assigns an address to the slave, designates the address, pages the slave in a page mode, and identifies the slave. The identified slave is turned to be in an active mode, which is the connected state, and is shifted to be in a data transmission mode so that data can be transferred between the slave and the master.

In step s3, it is determined whether or not there is a peripheral apparatus to be added to the network 1 as a slave. When there is a peripheral apparatus to be added, an operation such as a slave power-on is performed. In step s4, in order to connect that apparatus to the network 1, a setting file is read in. The setting file contains information for selecting and setting a peripheral apparatus to be used for each application. In step s5, it is determined whether or not a selected application already has been started. When it is determined that it has not started yet, a selected application is started in step s6. When the selected application is in operation in step s5 or after it is started in step s6, the procedure goes to step s7. Also when it is determined that there is no slave to be added in step s3, the procedure goes to step s7.

In step s7, it is determined whether or not the slave power is cut and is off. When it is determined that the slave power is not off, it is determined whether or not the master power is turned off in step s8. When the master power is not off, the procedure goes back to step s3.

When it is determined that slave power is off in step s7, it is determined whether or not a selected application is in operation in step s9. When it is determined that it is in operation, the selected application is ended in step s10, and the procedure goes back to step s3. Also when it is determined that the selected application is not in operation in step s9, the procedure goes back to step s3. When it is determined that the master power is off in step s8, an end notification is supplied to the peripheral apparatuses in step s11, and the procedure ends at step s12. The peripheral apparatuses that received the end notification are shifted to be, for example, in a low power consumption state or stop their operation.

In this embodiment, when connecting the apparatuses to form a wireless data communication network among the plurality of apparatuses having a wireless data communication function typified by Bluetooth, the apparatuses that can be connected within a predetermined range are displayed on a display screen 7 for apparatus selection. When a user selects an apparatus to be actually connected from the display screen 7 for apparatus selection, selection of an apparatus can be easily performed. When an apparatus is selected, selection candidates for setting a connection form are displayed on the display screen 8 for function selection for each function required by an apparatus so that when the user performs a selection operation while looking at the screen, control data transfer is performed in accordance with the selection results among the apparatuses, and the connection form is set according to the selection of the user.

Figure 3A:
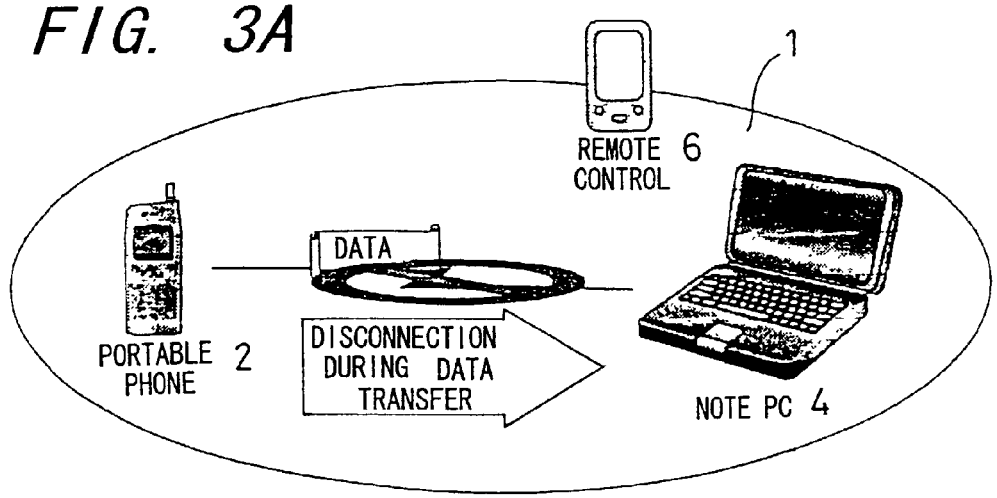
FIGS. 3A and 3B are a schematic view showing an example of disconnection during data transfer and a view showing the manner in which reconnection data transfer conditions are set in the embodiment of FIG. 1.
Figure 3B:
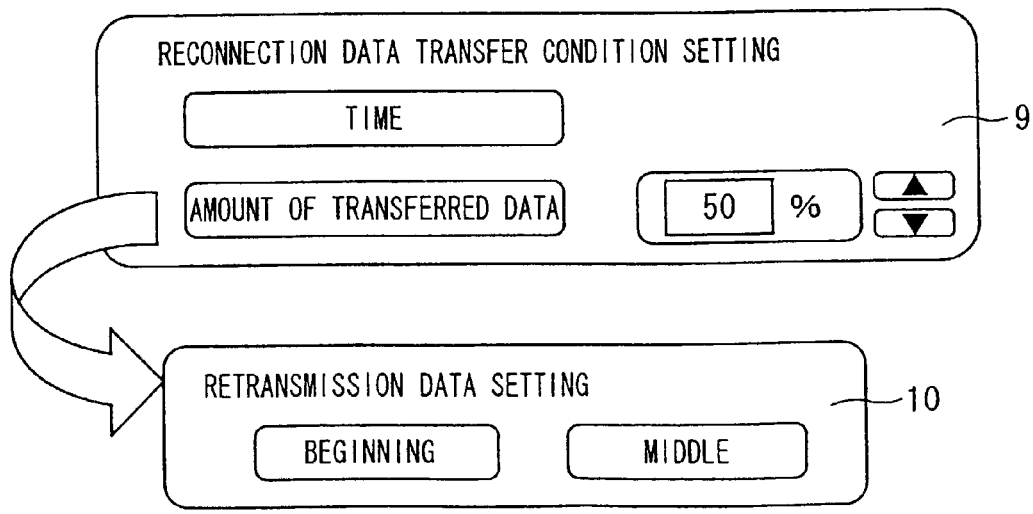

FIGS. 3A and 3B show the setting of reconnection conditions when a disconnection is caused during data transfer in the network 1 of FIG. 1A. As shown in FIG. 3A, a disconnection may occur during data transfer of E-mail or the like from the mobile phone 2 to the note PC 4. In Bluetooth, data are transmitted in a packet unit, and each packet is provided with information for error detection, so that a detection of an error results in an operation error, so that data transfer is interrupted. When data transfer is interrupted, retransfer of data is performed under the reconnection data transfer conditions that are set as shown in a display screen 9 for reconnection condition setting of FIG. 3B. The reconnection data transfer condition can be set by time or the amount of transferred data. For the amount of transferred data, a ratio basis of data that have been transferred until the interruption with respect to the entire amount is set. When this basis is set, the screen is shifted to a display screen 10 for retransmission data setting, and it is set whether the data or the packet is transferred from the beginning of the data or the packet or the middle thereof at the interruption.

Figure 4:
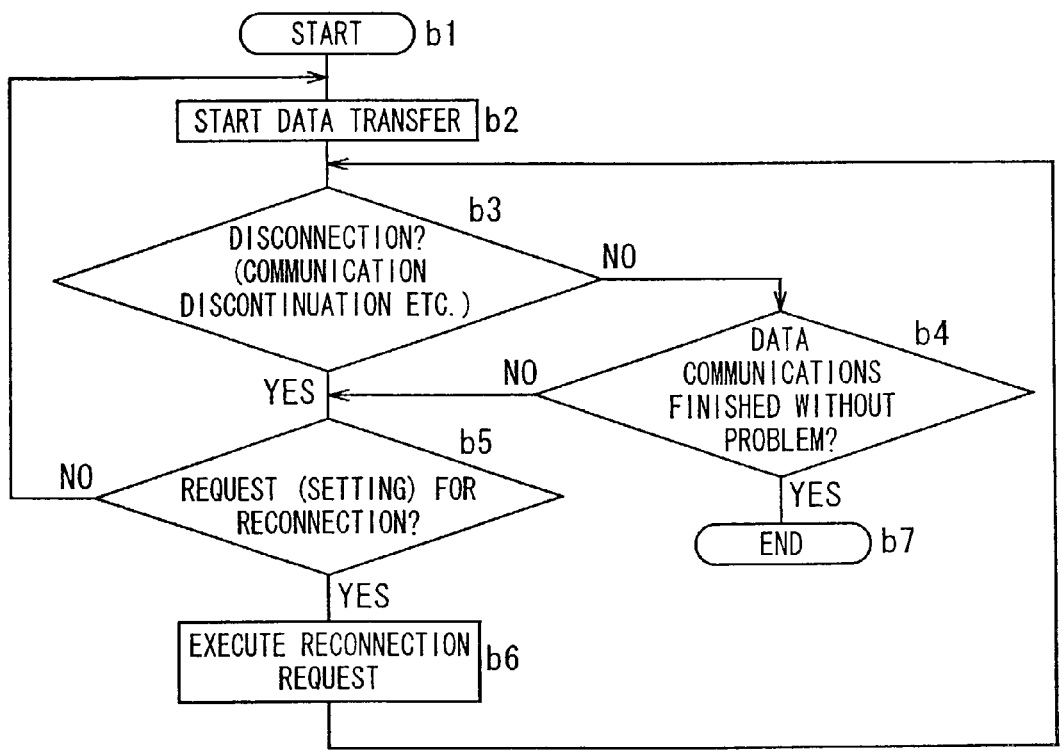
FIG. 4 is a flowchart showing a procedure of data transfer involving a reconnection of FIG. 3.

FIG. 4 shows a data transfer procedure involving a reconnection that is performed in accordance with the setting results in FIG. 3B. In step b1, the data transfer procedure starts, and data transfer starts in accordance with a sequence of transfer of data in step b2. In step b3, it is determined whether or not there is a disconnection. When there is no disconnection such as discontinuation of communication, it is determined whether or not data communication is ended without problems in step b4. In step b4, when it is determined that data communication is not ended yet, or it is determined that there is a disconnection in step b3, it is determined whether or not a request (setting) for reconnection is performed as in FIG. 3B in step b5. When it is determined that there is no request, the procedure goes back to step b2 to continue data transfer. When it is determined that there is a request in step b5, the reconnection request is executed in step b6, and the procedure goes back to step b3. When it is determined that data communication is ended without problems in step b4, the procedure ends at step b7.

In this embodiment, data is transferred in a packet unit, and the request for reconnection is defined as to whether data is retransmitted from the beginning of the packet being transmitted at the time of disconnection of the data transfer or from the middle of the packet. With the display screen 10 for retransmission data setting of FIG. 3B, data is transferred in a packet unit and the user can set the retransfer condition when data transfer is disconnected in the middle of a packet by selecting whether the data is retransferred from the beginning of the packet or the middle thereof.

In the above description, Bluetooth has been explained as a wireless data communication function. However, the present invention also can be applied to a wireless LAN (Local Area Network) that is mapped out by US IEEE (the Institute of Electrical and Electronics Engineers, Inc.) called IEEE802.11, Home RF that is being mapped out as a home wireless network and the like.

Furthermore, various setting is performed by the mobile phone 2. This function is executed by an application program for setting that is operated on the mobile phone 2. This application program can be previously stored in a ROM, but also can be downloaded from a site on the Internet when desired by a user. Alternatively, a communication control program is read in a computer such as a note PC 4 or PDA 5 as an application program, so as to be executed. The note PC 4 or the PDA 5 in which the communication control program is read functions as a communication control apparatus. Furthermore, a communication control apparatus dedicated for the operation of communication control of the present invention can be used. If the communication control program is stored in a built-in ROM, this facilitates use more than when the communication control program is read in a computer for general purposes and is run on the computer.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A method for controlling communications in a wireless data communication network formed by connecting a plurality of apparatuses having a wireless data communication function, the method comprising:

when connecting each apparatus to the wireless data communication network, displaying apparatuses within a predetermined range that are connectable to the wireless data communication network on a screen;

displaying at least one selection candidate to be set for each of a plurality of functions within the wireless data communication network on a screen in response to a selection of an apparatus by a user from the displayed apparatuses, the at least one selection candidate being an apparatus which has been selected by the user from the displayed apparatuses; and performing setting of a connection form for a selection candidate selected from the displayed at least one selection candidate in accordance with a selection for each of the plurality of functions by the user.

2. A communication control program for realizing the method for controlling communications in a wireless data communication network of claim 1.

3. A communication control apparatus for realizing the method for controlling communications in a wireless data communication network of claim 1.

4. A method for controlling communications in a wireless data communication network formed by connecting a plurality of apparatuses having a wireless data communication function, the method comprising:

when connecting apparatuses to the wireless data communication network, displaying apparatuses within a predetermined range that are connectable to the wireless data communication network on a screen;

displaying a selection screen for setting a data transfer condition for an apparatus selected by a user in response to the selection of the apparatus by the user;

performing setting of the data transfer condition in accordance with a selection result; and displaying a screen for setting whether data is transferred from a beginning of the data or a middle of the data as a reconnection data transfer condition at a time of disconnection of the data transfer in a ratio of transferred data with respect to entire data.

5. The method of claim 4, wherein the data transfer is performed in packet units, and the reconnection data transfer condition is set by selecting whether the data is retransmitted from a beginning of a packet that is being transmitted at the time of disconnection of the data transfer or from a middle of the packet.

6. A communication control program for realizing the method for controlling communications in a wireless data communication network of claim 5.

7. A communication control apparatus for realizing the method for controlling communications in a wireless data communication network of claim 5.

8. A communication control program for realizing the method for controlling communications in a wireless data communication network of claim 4.

9. A communication control apparatus for realizing the method for controlling communications in a wireless data communication network of claim 4.

10. A program recorded on a computer readable recording medium for use with a computer to implement connection of a plurality of apparatuses having a wireless data communication function to a wireless data communication network, the program comprising:

a display operation of displaying apparatuses within a predetermined range that are connectable to the wireless data communication network on a screen;

a display operation of displaying at least one selection candidate to be set for each of a plurality of functions within the wireless data communication network on a screen in response to a selection of an apparatus by a user from the displayed apparatuses, the at least one selection candidate being an apparatus which has been selected by the user from the displayed apparatuses; and a setting operation of performing setting of a connection form for a selection candidate selected from the displayed at least one selection candidate in accordance with a selection for each of the plurality of functions by the user.

11. A program recorded on a computer readable recording medium for use with a computer to implement connection of a plurality of apparatuses having a wireless data communication function to a wireless data communication network, the program comprising:

a display operation of displaying apparatuses within a predetermined range that are connectable to the wireless data communication network on a screen;

a display operation of displaying a selection screen for setting a data transfer condition for an apparatus selected by a user in response to the selection of the apparatus by the user to perform setting of the data transfer condition in accordance with a selection result; and a display operation of displaying a screen for setting whether data is transferred from a beginning of the data or a middle of the data as a reconnection data transfer condition at a time of disconnection of the data transfer in a ratio of transferred data with respect to entire data.

* * * * *